US012285831B2

(12) United States Patent
Jakob et al.

(10) Patent No.: US 12,285,831 B2
(45) Date of Patent: Apr. 29, 2025

(54) ADJUSTING DEVICE FOR A GEAR CUTTING MACHINE WITH A REDUCED TENDENCY TO VIBRATE

(71) Applicant: REISHAUER AG, Wallisellen (CH)

(72) Inventors: Ronald Jakob, Russikon (CH); Michael Mros, Weingarten (DE); André Eger, Wallbach (CH)

(73) Assignee: REISHAUER AG, Wallisellen (CH)

( * ) Notice: Subject to any disclaimer, the term of this patent is extended or adjusted under 35 U.S.C. 154(b) by 913 days.

(21) Appl. No.: 17/267,983

(22) PCT Filed: Aug. 12, 2019

(86) PCT No.: PCT/EP2019/071575
§ 371 (c)(1),
(2) Date: Feb. 11, 2021

(87) PCT Pub. No.: WO2020/038751
PCT Pub. Date: Feb. 27, 2020

(65) Prior Publication Data
US 2021/0308811 A1    Oct. 7, 2021

(30) Foreign Application Priority Data
Aug. 24, 2018 (CH) ........................... 1023/18

(51) Int. Cl.
*B23Q 1/58* (2006.01)
*B23F 23/12* (2006.01)
(Continued)

(52) U.S. Cl.
CPC ............... *B23Q 1/58* (2013.01); *B23F 23/12* (2013.01); *B23Q 1/28* (2013.01); *B23Q 11/0032* (2013.01)

(58) Field of Classification Search
CPC .. B23F 23/12; B23Q 1/28; B23Q 1/58; B23Q 11/0032
See application file for complete search history.

(56) References Cited

U.S. PATENT DOCUMENTS 5,462,361 A    10/1995 Sato et al.
5,617,772 A *   4/1997 Hosono ................. F15B 15/082
                                                              92/138
(Continued)

FOREIGN PATENT DOCUMENTS

CN    107081621 A    8/2017
DE    43 18 428 A1   12/1994
(Continued)

OTHER PUBLICATIONS

EPO Machine Translation of WO9409287A1, "Damper for Linear Rolling Bearing Guides", Apr. 28, 1994.*
(Continued)

*Primary Examiner* — Charles A Fox
*Assistant Examiner* — Gregory T Prather
(74) *Attorney, Agent, or Firm* — Sughrue Mion, PLLC

(57) ABSTRACT

An adjusting device for a machine tool comprises a base body (1), a movable body (2) movable along a moving direction (X) relative to the base body, and a drive (3) for moving the movable body relative to the base body. In order to effectively damp vibrations between the movable body and the base body (in particular so-called stray vibrations) and yet still enable rapid positioning movements of the movable body relative to the base body, the adjusting device comprises an auxiliary body (10) which can be releasably fixed to the base body and, in the released state, can be moved together with the movable body relative to the base body. The adjusting device also comprises at least one
(Continued)

vibration damper (11) which is arranged between the auxiliary body and the movable body.

22 Claims, 4 Drawing Sheets

(51) Int. Cl.
    *B23Q 1/28*     (2006.01)
    *B23Q 11/00*     (2006.01)

(56) References Cited

U.S. PATENT DOCUMENTS

| | | | | |
|---|---|---|---|---|
| 5,880,965 | A | * | 3/1999 | Nakamura ....... G05B 19/41865 700/175 |
| 6,009,981 | A | * | 1/2000 | Wolfe ................... F15B 15/262 188/267 |
| 9,339,909 | B2 | * | 5/2016 | Affaticati ............. B23Q 39/028 |
| 2014/0157962 | A1 | * | 6/2014 | Shirone ................. B23Q 3/066 29/33 P |
| 2018/0021904 | A1 | * | 1/2018 | Koike ................ F16F 15/0235 384/99 |

FOREIGN PATENT DOCUMENTS

| | | |
|---|---|---|
| DE | 37 42965 A1 | 7/1998 |
| DE | 10 2010 023 190 A1 | 12/2011 |
| EP | 0 673 709 A1 | 9/1995 |
| EP | 2 774 709 A2 | 9/2014 |
| WO | 94/09287 A1 | 4/1994 |

OTHER PUBLICATIONS

Günther Gravel, "Bestimmung von Welligkeiten auf Zahnflanken" ["Determination of waviness on tooth flanks"], GETPRO Congress on Gear Production, Würzburg, Mar. 2009, 12 pgs.
Matthias Baur, "Aktives Dämpfungssystem zur Ratterunterdrückung an spanenden Werkzeugmaschinen" ["Active damping system for chatter suppression on metal-cutting machine tools"], dissertation, Technische Universität München, 2014, 16 pgs.
H. Schriefer et al., "Kontinuierliches Wälzschleifen von Verzahnungen" ["Continuous Generating Gear Grinding"], Reishauer AG 2008, ISBN 978-3-033-01447-3, describes on pp. 84 to 161 and 471 to 571.
International Search Report for PCT/EP2019/071575 dated, Dec. 6, 2019 (PCT/ISA/210).
English Translation of Notification of the First Office Action issued Feb. 22, 2022 in Chinese Application No. 201980055745.9.

* cited by examiner

ADJUSTING DEVICE FOR A GEAR CUTTING MACHINE WITH A REDUCED TENDENCY TO VIBRATE

CROSS REFERENCE TO RELATED APPLICATIONS

This application is a National Stage of International Application No. PCT/EP2019/071575 filed Aug. 12, 2019, claiming priority based on Swiss Patent Application 01023/18 filed Aug. 24, 2018.

TECHNICAL FIELD

The present invention relates to a motor-driven adjusting device for a gear cutting machine, a gear cutting machine equipped therewith and a method for machining a workpiece with such a gear cutting machine.

PRIOR ART

Since the early days of the construction of gear cutting machines, designers have been confronted with unwanted vibrations in gear machines. H. Schriefer et al., "Kontinuierliches Walzschleifen von Verzahnungen" ["Continuous Generating Gear Grinding"], Reishauer AG 2008, ISBN 978-3-033-01447-3, describes on pages 84 to 161 and 471 to 571 the design and function of modern gear cutting machines. Such gear cutting machines usually contain well over a thousand components that oscillate with an unmanageable number of degrees of freedom during operation. This oscillating system causes undesired relative movements between tool and workpiece, which inevitably lead to a change in the chip thickness and thus the cutting force and directly influence the production result. A changed cutting force in turn causes a reaction of the finitely rigid machine structure, resulting in a closed loop of dynamic interaction between the cutting process and the machine structure and causing self-excited vibrations. These phenomena are perceived as vibrations in the assemblies of the gear cutting machine.

Even the smallest relative movements between tool and workpiece in the micrometer range, such as can be caused by so-called stray vibrations, can lead to disturbing manufacturing deviations. Such manufacturing deviations have a particularly negative effect in the finishing of a gear wheel, because the gear wheel is installed in a gearbox after finishing without further treatment. In particular, such manufacturing deviations can manifest themselves as ripples on the tooth flanks, which cause disturbing, usually high-frequency noise when used in a gearbox. Such noises are also called "ghost frequencies". Especially in motor vehicles, engine noises are becoming less and less. Therefore, transmission noises, and especially their high-frequency components, are increasingly perceived as disturbing. In electrically driven vehicles, these noises may even dominate the driving noise under certain circumstances.

Gunther Gravel, "Bestimmung von Welligkeiten auf Zahnflanken" ["Determination of waviness on tooth flanks"], GETPRO Congress on Gear Production, Würzburg, March 2009, highlights the difficulties of correctly detecting waviness on tooth flanks that leads to "ghost frequencies" and proposes a new evaluation method for this purpose.

There have been many efforts to avoid or suppress undesirable vibrations in gear cutting machines.

Matthias Baur, "Aktives Dampfungssystem zur Ratterunterdrtickung an spanenden Werkzeugmaschinen" ["Active damping system for chatter suppression on metal-cutting machine tools"], dissertation, Technische Universitat Munchen 2014, summarizes the state of the art in this field on pages 3 to 31 and, based on this, proposes to suppress vibrations by means of active damping systems (Active Vibration Control, AVC). In particular, pages 67 to 70 and 129 to 139 suggest the use of an active damping system on the workpiece spindle of a gear grinding machine.

DE 10 2010 023 190 A1 proposes to avoid chatter vibrations in a machine tool for metal-cutting workpiece machining by superimposing a modulating additional movement on the cutting and/or feed movement.

In EP 2 774 709 A2, it is proposed to apply periodic waviness corrections or waviness modifications to the tooth flanks of a gear. For this purpose, rotational distance error measurements of gear pairs are carried out in a gear measuring device or a gearbox to determine a rotational error extent. This measurement result is used as an input variable to define the amplitude, frequency and phase position for the periodic flank waviness corrections on the tooth flanks of the gear pairs. This procedure does not address the source of the problem, but merely fights the symptoms.

In a machine tool, especially adjusting devices for changing the position of different parts of the machine tool in relation to each other form potentially oscillating systems. Such adjusting devices are usually realized as numerically controlled axes (NC axes). A typical linear NC axis comprises a slide, which is guided on one or more linear guiding elements on a base body and whose position relative to the base body is adjustable by means of an NC controlled drive. The drive can include, for example, a servo motor that drives the slide via a ball screw. A rotary NC axis (rotary or swivel axis) usually comprises a spindle which can be driven to rotate and which moves a rotary or swivel body directly or via a gear unit.

SUMMARY OF THE INVENTION

It is an object of the present invention to provide a motor-driven adjusting device for a machine tool, which is designed in such a way that undesirable vibrations can be avoided or at least efficiently damped. The measures for avoiding or damping the vibrations should not impede fast positioning movements with the aid of the adjusting device.

An adjusting device for a gear cutting machine, especially for finishing operations, is provided, comprising:
 a base body;
 a movable body, which is movable along a direction of movement relative to the base body; and
 a (preferably NC-controlled) drive for moving the movable body relative to the base body.

In order to reduce the tendency of the adjusting device to vibrate, the adjusting device comprises an auxiliary body, which is configured to be releasably fixed to the base body so that the auxiliary body and the base body form a rigid connection, and which is configured to be moved together with the movable body in the released state. The adjusting device further comprises at least one vibration damper, which is arranged between the auxiliary body and the movable body.

The terms "base body" and "movable body" are to be understood in such a way that a relative movement between the base body and the movable body is possible. The base body itself does not necessarily have to be stationary in relation to a machine bed, but may itself be arranged on a moving part of a machine.

The auxiliary body is connected to the movable body via at least one vibration damper. During workpiece processing, the auxiliary body can be fixed to the base body. This causes the auxiliary body and the base body to form a rigid unit with a relatively large mass. Vibrations between the movable body and the unit consisting of the auxiliary body and the base body are efficiently damped by means of the at least one vibration damper. When there is a relative movement between the auxiliary body and the movable body, the vibration damper generates a damping force, which is preferably opposite to the direction of movement. This effectively reduces the overall tendency of the adjusting device to vibrate.

If the position of the movable body in relation to the base body is to be changed quickly and/or over a large range, the connection between the auxiliary body and the base body can be released. Now the auxiliary body together with the vibration damper can follow the movements of the movable body in relation to the base body without the damping force of the vibration damper counteracting such a movement. The auxiliary body and the vibration damper may also have a relatively low mass, so that the movement of these parts does not place a significant additional load on the drive. All in all, high axis loads during fast positioning movements are avoided in this way. In addition, this makes it possible to use vibration dampers that are only designed for small machining strokes or small amplitudes. In this way, the efficiency of the vibration damper can be significantly improved compared to a vibration damper that must be effective over the entire range of motion of the movable body, and the vibration damper can always work at the same operating point regardless of the approached position.

In order to avoid asymmetries in the damping characteristics, it is advantageous if the adjusting device comprises two vibration dampers which are arranged between the auxiliary body and the movable body, the two vibration dampers being arranged symmetrically on the movable body with respect to a normal plane extending perpendicular to the direction of movement. Preferably, the two vibration dampers are constructed identically.

Each of the vibration dampers may be an active or passive vibration damper. Combinations of active and passive vibration dampers are also conceivable.

If a passive vibration damper is used, it may be, e.g., a fluidic damper or a frictional damper. Both types of vibration dampers are well known as such from the prior art. Frictional dampers extract vibration energy from the system by frictional processes between two solids moving relative to each other. Fluidic dampers are divided into the following subtypes: (i) squeeze-film dampers, in which a fluid is displaced from a gap between two plates oscillating in a normal direction to each other; (ii) shear dampers, in which a fluid in the gap between two plates oscillating in parallel is subjected to shear stress; and (iii) displacement dampers (piston dampers), in which a fluid is forced through a throttle. In the context of the present invention, displacement dampers in particular have proved to be particularly suitable because they exhibit good damping properties over a relatively large adjustment travel.

If an active vibration damper is used, it comprises at least one actuator for generating mechanical energy by converting externally supplied energy. In particular, the actuator may be an electrodynamic or piezoelectric actuator. The actuator is preferably located in the force flow between the auxiliary body and the movable body. Furthermore, the active vibration damper may comprise at least one sensor for detecting vibrations of the movable body, in particular a displacement sensor, force sensor and/or acceleration sensor (inertial sensor), as well as a control device. The control device is then designed to receive sensor signals from the at least one sensor and to use these sensor signals to control the at least one actuator in such a way that the actuator counteracts the vibrations.

In some embodiments, the at least one vibration damper may have adjustable damping characteristics. The damping characteristics of the vibration damper may be adjustable under NC control, in particular by means of a suitable setting device. For example, in the case of a displacement damper, the free cross-sectional area of the throttle may be changed by a setting mechanism, as it is known as such, and/or the pressure of a compressible fluid in the vibration damper may be changed by means of a pressure actuator. In the case of a shear damper, for example, its gap size may be changed. In the case of an active vibration damper, for example, parameters of the control device may be changed which influence the damping properties of the active vibration damper, e.g. the center frequency and/or the damping of a filter in the control device of the active vibration damper. This allows the damping properties to be optimized for the respective gear cutting machine and machining task.

The adjusting device may include a device for performing an automatic frequency response analysis, said device being operatively connected to the at least one vibration damper in order to automatically modify its damping characteristics on the basis of a result of the frequency response analysis. In a frequency response analysis, the vibration characteristics of the axis that is adjustable by the adjusting device are determined automatically. On this basis, the damping properties of the vibration damper may be changed automatically under NC control. For example, if the frequency response analysis shows that particularly strong vibrations occur at a certain frequency, one or more parameters of the control device may be automatically adjusted in the case of an active vibration damper so that the active vibration damper damps vibrations at this frequency particularly effectively. A device for performing a frequency response analysis is often standard equipment in modern gear cutting machines.

In advantageous embodiments, the auxiliary body is configured to be fixed to the base body by a clamping device. A clamping connection can be established and released particularly easily.

The adjusting device may comprise at least one NC-controlled actuator to fix the auxiliary body to the base body and/or to release it from the base body. If the auxiliary body is configured to be fixed to the base body by a clamping device, the actuator may thus preferably establish and/or release the clamping under NC control.

The adjusting device may comprise at least one sensor to determine one or more of the following variables: a distance between the auxiliary body and the movable body; a force between the auxiliary body and the movable body; and an acceleration of the movable body relative to the auxiliary body. This is not only useful for an active vibration damper, as mentioned above, but also for passive vibration dampers, e.g. to characterize the vibration behavior of the movable body.

The movement of the movable body relative to the base body may be, in particular, linear or rotatory.

If the movement is linear, the movable body may be configured as a sliding carriage. The adjusting device may then include at least one linear guide to guide the movable body on the base body.

The linear guide may be configured as a rolling guide in a manner known per se. The present invention is particularly valuable in the case of a rolling guide, because due to its design a rolling guide usually has much worse damping properties than, for example, a sliding guide.

The linear guide will usually comprise a linear guide element which is rigidly or at least axially immovably connected to the base body, e.g. a rail, with the movable body guided on this linear guide element. In some embodiments, the auxiliary body is then also guided on the linear guide element. In this case no separate linear guide for the auxiliary body is required. The auxiliary body may be fixed to the linear guide element relative to the base body, especially by clamping.

In other embodiments, the adjusting device may include an auxiliary guide, which is separate from the linear guide and parallel to it. The auxiliary body is then guided by the auxiliary guide on the base body. The auxiliary guide may comprise a linear guide element which is rigidly or at least axially immovably connected to the base body, e.g. in the form of a rail or a rod. The auxiliary body may then be guided on the linear guide element of the auxiliary guide and may be fixed to the linear guide element of the auxiliary guide, especially by clamping.

In some embodiments, the movable body may be designed as a swivel body, in which case the swivel body is supported on the base body to swivel. The adjusting device may then comprise a guide element extending in the form of a ring or partial ring (circular arc), e.g. in the form of a rail, the guide element being connected to the base body rigidly or at least non-rotatably with respect to the swivel axis, and the auxiliary body may be guided on this guide element. The auxiliary body may be fixed by clamping to the guide element and the base body.

A machine tool is also disclosed, in particular a gear cutting machine, which comprises at least one adjusting device of the type described above. In particular, an adjusting device of the above-mentioned type may be configured to move a column of the gear cutting machine relative to the machine bed. In this case, the base body is formed by the machine bed, while the movable body is formed by the column. An adjusting device of the above-mentioned type may also be used to move a feed slide of the gear cutting machine relative to the column. In this case, the column forms the base body and the feed slide forms the movable body. An adjusting device of this type may also be used to swivel a tool head of the gear cutting machine relative to a feed slide in order to set a helix angle. In this case, the feed slide forms the base body and the tool head forms the movable body. A variety of other possible applications of the described adjusting device on a machine tool is conceivable.

Also disclosed is a method for machining a workpiece, in particular a pre-toothed workpiece, with a machine tool of the aforementioned type. The process comprises the following steps:
 releasing the auxiliary body from the base body;
 moving the movable body relative to the base body by means of the drive while the auxiliary body is released from the base body, the movable body taking the auxiliary body with it;
 fixing the auxiliary body to the base body; and
 machining the workpiece while the auxiliary body is fixed to the base body.

In such a process, it is conceivable in particular that the movable body is moved relative to the base body by means of the drive during the machining of the workpiece, while the auxiliary body remains fixed to the base body. If, for example, the movable body is a feed slide, it is conceivable to perform a feed movement during the machining of the workpiece without releasing the auxiliary body from the base body. In this case, it is necessary to design the vibration damper so that it has a correspondingly large working range (travel).

As already mentioned, it is conceivable to modify the damping properties of at least one vibration damper within the scope of such a procedure, e.g. to adapt these damping properties to a certain processing situation, and it is conceivable to do this on the basis of a frequency response analysis.

BRIEF DESCRIPTION OF THE DRAWINGS

Preferred embodiments of the invention are described in the following with reference to the drawings, which serve only for explanation and are not to be interpreted as limiting. In the drawings.

DESCRIPTION OF PREFERRED EMBODIMENTS

Figure 1:
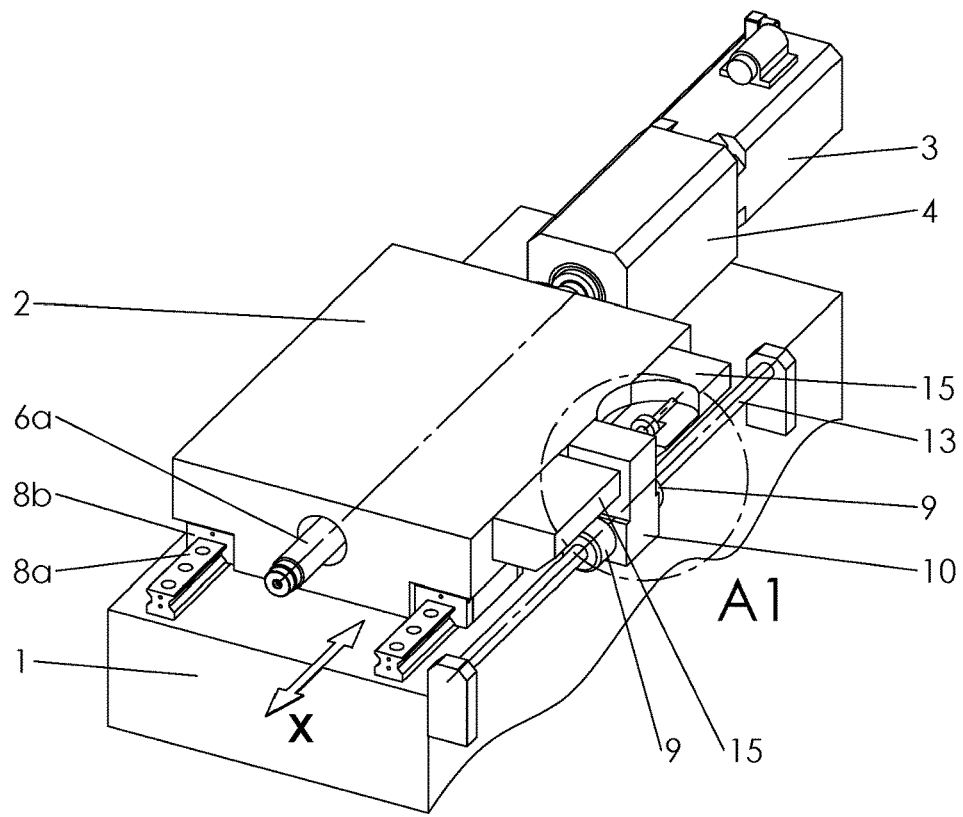
FIG. 1 shows an adjusting device according to a first embodiment of the invention in a schematic perspective view.
Figure 2:
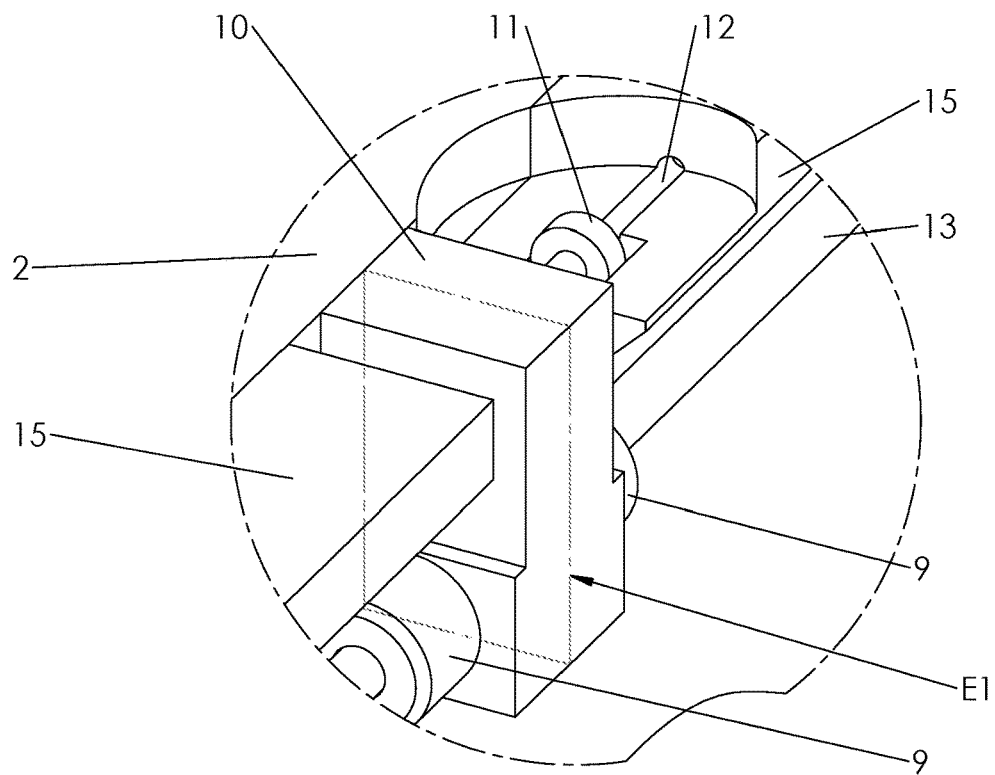
FIG. 2 shows an enlarged section of FIG. 1 in region A1.

FIGS. 1 and 2 schematically illustrate a first embodiment of the invention. A movable body in the form of a slide 2 is displaceably arranged on a base body 1. Two parallel profile rails 8*a* are rigidly connected to the base body 1. The profile rails extend along the X-direction. Four guide carriages 8*b* are rigidly connected to the slide 2. Two guide carriages 8*b* are assigned to each profile rail 8*a*, one of these guide carriages being located at a front end of slide 2 with respect to the X direction and the other guide carriage being located at a rear end of slide 2 with respect to the X direction. Together with the profile rails 8*a*, the carriages 8*b* form a linear rolling guide. For this purpose, rolling elements are arranged in the carriages 8*b* in a manner known per se.

An NC-controlled servomotor 3 with associated drive housing 4 is mounted on the base body 1. The servo motor 3 drives a threaded spindle 6*a* of a ball screw drive to rotate. The threaded spindle 6*a* extends through slide 2 and interacts with a spindle nut not shown, which is rigidly connected to slide 2 inside the latter. Thus the servo motor 3 together with the ball screw drive forms a drive to move slide 2 linearly with respect to the base body 1.

A guide rod 13 of an auxiliary guide, which extends along the X direction and is rigidly connected to the base body 1, is arranged in a region laterally adjacent to slide 2. An auxiliary body 10 is guided on the guide rod 13. NC-controlled clamping devices 9 are arranged on the guide rod before and after the auxiliary body 10 with respect to the X direction, respectively. The clamping devices 9 are rigidly connected to the auxiliary body 2. When the clamping devices 9 are released, the auxiliary body 10 can be moved along the guide rod 13 together with the clamping devices 9. When the clamping devices 9 are activated, they fix the auxiliary body 10 to the guide rod 13, allowing the NC-controlled fixing of the auxiliary body 10 to the base body 1.

Above the guide rod 13, two damper mounts 15 are arranged on slide 2 and rigidly connected to slide 2. There is a gap between the damper mounts 15 with respect to the X-direction. The auxiliary body 10 projects into this gap from below.

Each of the two damper mounts 15 holds a fluidic vibration damper 11, which is shown only very schematically in FIGS. 1 and 2. Specifically, the vibration damper is a displacement damper (piston damper). In such a vibration damper, a piston is moved in a cylinder filled with fluid. The fluid is pressed through a throttle connecting the two sides of the piston to achieve a damping effect. The damping properties are influenced by the type of fluid and the free cross-section of the throttle. If the fluid is a compressible gas, the damping properties are also influenced by the gas pressure. Such vibration dampers are as such known from the prior art.

In this example, the cylinder of the vibration damper is formed by the damper mount 15, which is rigidly connected to the slide 2. The piston of the vibration damper is connected to the auxiliary body 10. In this way, the vibration damper 11 is designed to damp vibrations between the auxiliary body 10 and the slide 2.

In the standard VDI 3833, Part 1, 2009, the term "damping" is defined as follows: "Damping is the conversion of kinetic energy into forms of energy which become ineffective for the vibration system under consideration [ . . . ]. It is therefore the removal of this energy (energy dissipation) beyond the considered limits of the vibratory system." The term "damping" is understood in this document in accordance with this definition.

In the present embodiment, there are two vibration dampers of the same type, which are arranged symmetrically to each other on the auxiliary body 10 with respect to a mirror plane E1. The mirror plane is perpendicular to the X direction. This ensures that the same damping effect always occurs regardless of whether slide 2 moves relative to auxiliary body 10 along the positive or negative X direction.

With the aid of the clamping devices 9, the auxiliary body 10 can be fixed to the guide rod 13 and thus to the base body 1. The vibration dampers 11 thus act effectively between the slide 2 and the base body 1. If vibrations occur between the slide 2 and the base body 1, they are effectively damped by the vibration dampers 11.

If, on the other hand, the slide 2 is to be moved quickly to another position, the clamping devices 9 can be released. Now it is possible to move the carriage 2 to another position with the help of the motor 3, whereby the carriage 2 takes the auxiliary body 10 and the clamping devices 9 with it during this movement via the vibration dampers 11. Since the clamping devices 9, the auxiliary body 10 and the vibration dampers 11 together have a considerably lower mass than the slide 2, the drive is not subjected to any significant additional load.

In practice, slide 2 will often carry another component of a machine tool. The clamping devices 9 are then mainly activated in those operating phases in which a tool 22 of the machine tool 25 is in machining contact with a workpiece 23. Due to the clamping, the vibration dampers 11 effectively counteract disturbing vibrations between slide 2 and base body 1 during machining. If a different relative position between tool and workpiece is to be assumed, slide 2 can be moved to another position while the clamping devices 9 are released. As soon as machining is continued in the new relative position, the clamping devices 9 are reactivated. As a result, the vibration dampers 11 always work at the same operating point regardless of the position of slide 2, and the vibration dampers 11 do not need to have such a long travel that they cover the entire range of movement of slide 2 relative to the base body 1.

Through a connector 12 (see FIG. 2), the pressure of the fluid in the vibration damper 11 can be changed. This allows the damping properties of the vibration damper 11 to be changed from the outside. This makes it possible to adapt the damping properties specifically to a concrete operating situation. By providing an NC-controlled pressure actuator, such an adjustment can even be made during operation. Instead of changing the fluid pressure, the damping properties can also be adapted in other ways, e.g. by changing the free cross-section of the throttle in the piston of the vibration damper 11.

Figure 3:
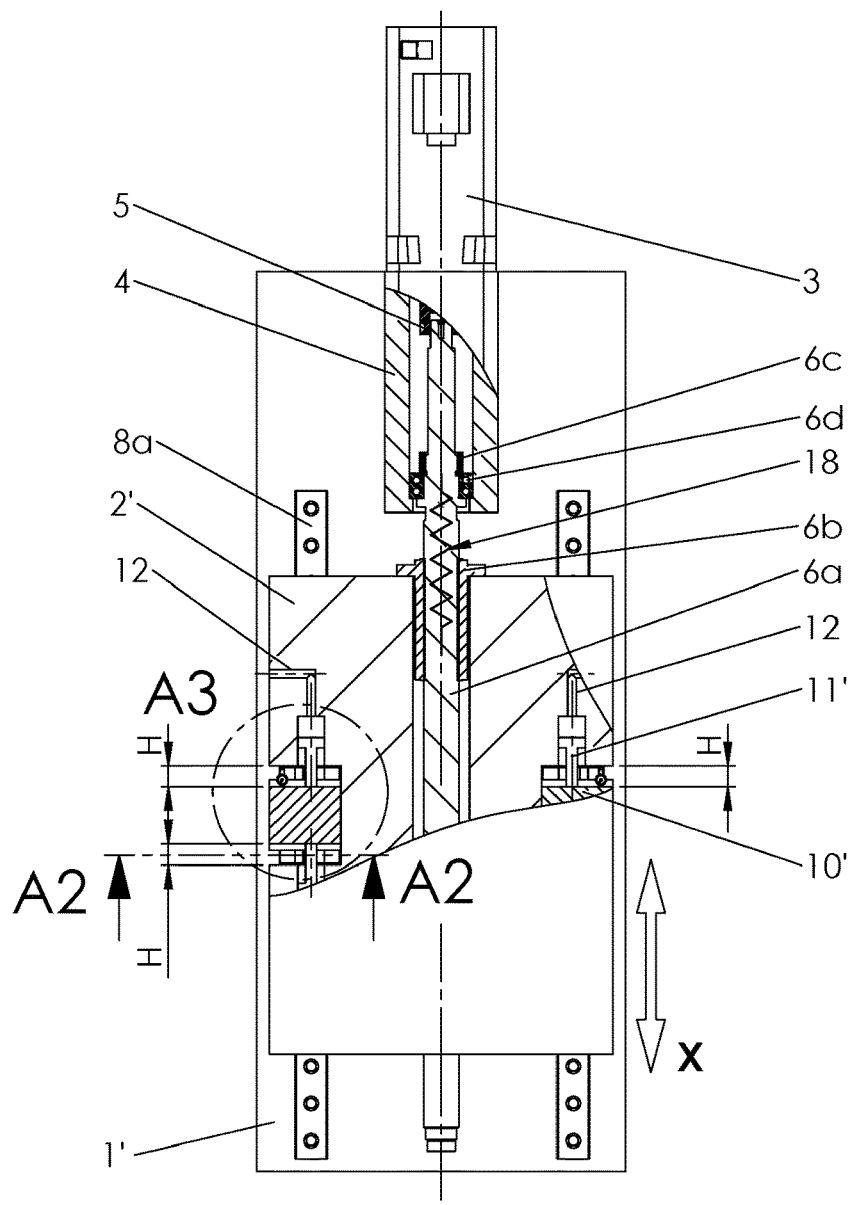
FIG. 3 shows an adjusting device according to a second embodiment of the invention in a schematic plan view, partially as a cutaway view.
Figure 4:
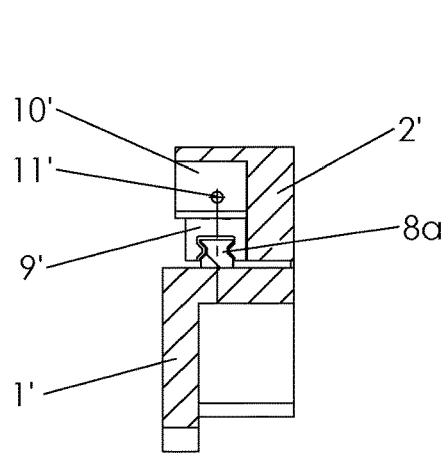
FIG. 4 shows an enlarged schematic sectional view of a section of the adjusting device of FIG. 3 in the plane A2-A2.
Figure 5:
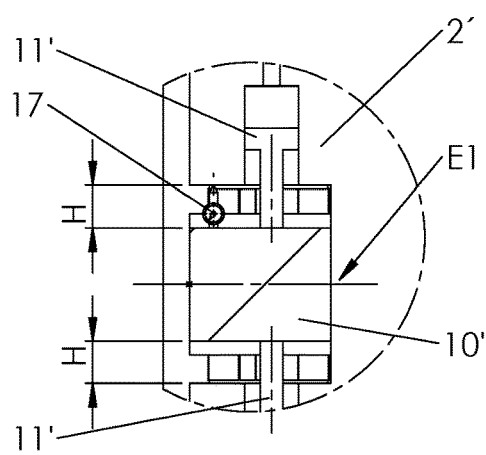
FIG. 5 shows an enlarged section of FIG. 3 in region A3.

A second embodiment of an adjusting device according to the invention is illustrated in FIGS. 3 to 5. Identical or similarly acting parts are marked with the same reference signs as in FIGS. 1 and 2.

Again, a carriage 2' is linearly guided on a base body 1' by means of two parallel profile rails 8a. For this purpose, four guide carriages 8b are again arranged at the corners of the carriage 2', as described in connection with FIG. 1, although these guide carriages 8b are not visible in FIGS. 3 to 5.

Again, the slide 2' can be moved along the X direction on the profile rails 8a with the help of a servo motor 3. A ball screw drive with threaded spindle 6a is used to transmit power. In contrast to FIG. 1, FIG. 3 also shows the already mentioned spindle nut 6b, the bearing nut 6c of the ball screw drive, which is rotatably mounted in the drive housing 4 via an axial bearing 6d, and a coupling 5 between servo motor 3 and threaded spindle 6a.

The slide 2' and the base body 1' again form an oscillating system along the X direction, which is schematically indicated in FIG. 3 by a schematic spring 18. In order to damp vibrations along the X direction, a mechanism similar to the one shown in FIGS. 1 and 2 is again provided. In contrast to the latter embodiment, however, there are two auxiliary bodies 10', which are arranged on both sides of the slide 2', and these auxiliary bodies can be fixed by clamping devices 9' to the same profile rails 8a on which the slide 2' is also guided on the base body 1'.

For this purpose, the carriage 2' has a recess on each of its two lateral sides in which one of the auxiliary bodies 10' is located. Each auxiliary body 10' is in turn connected to the carriage 2' via two symmetrically arranged vibration dampers 11'. Below each auxiliary body 10' there is a clamping device 9' which is rigidly connected to the respective auxiliary body 10'. The clamping device 9' itself forms a carriage which is supported slidingly on the respective profile rail 8a as long as the clamping device is not activated.

When the clamping device 9' is activated, it establishes a clamping connection between the clamping device 9' and the profile rail 8a and thus fixes the auxiliary body 10' to the base body 1'.

By arranging clampable auxiliary bodies 10' with two symmetrically arranged vibration dampers 11' each on both sides of the carriage 2', an improved damping effect can be achieved compared to a one-sided arrangement. In addition, this embodiment is more compact.

As illustrated in FIG. 5, the axial gap between the auxiliary body 10' and the slide 2' can be used to measure very precisely the travel H between the slide 2' and the clamped auxiliary body 10'. A suitable displacement sensor can be arranged in this gap for this purpose. Instead of or in addition to a displacement sensor, an acceleration sensor or a force sensor can also be provided between slide 2' and auxiliary body 10', for example. In this way the relative movements between the slide 2' and the clamped auxiliary body 10' can be characterized very precisely, e.g. with the aim of optimizing the damping settings of the adjustable vibration dampers 11'. In FIG. 5 the different sensor types are schematically shown as sensor 17.

Figure 6:
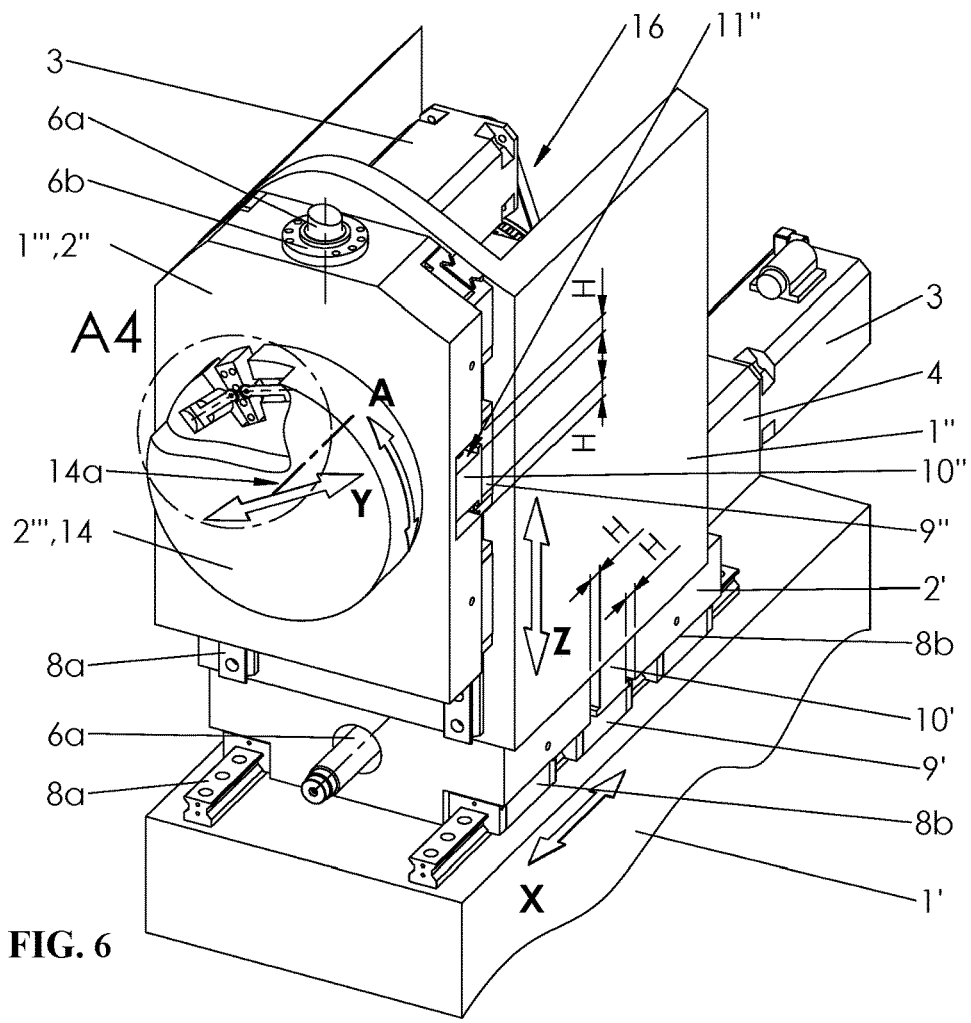
FIG. 6 shows a part of a gear cutting machine according to a third embodiment of the invention in a schematic perspective view.
Figure 7:
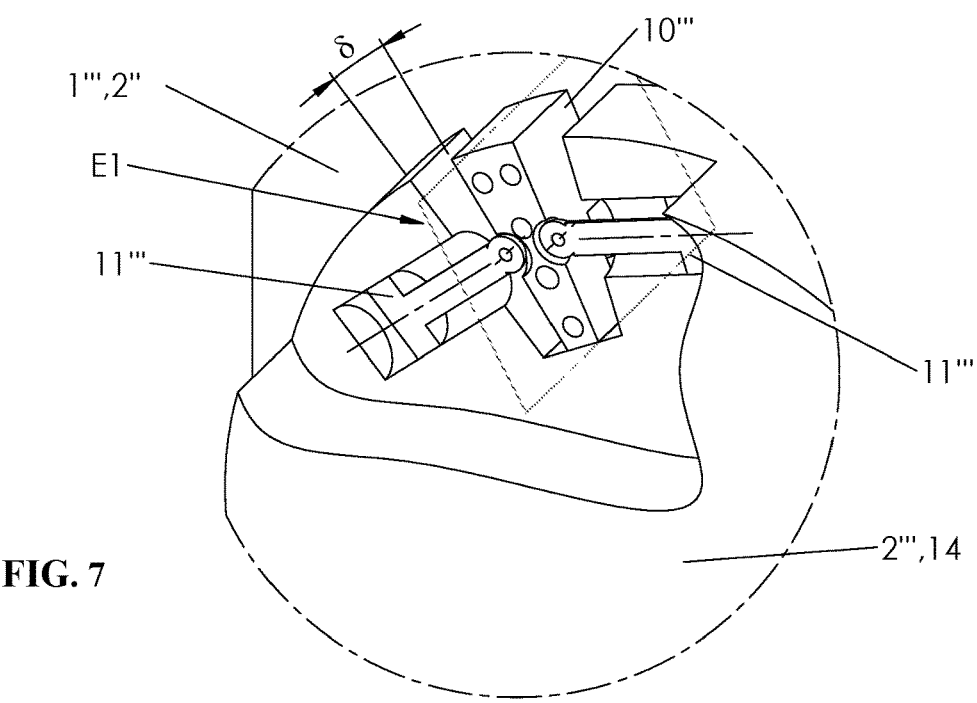
FIG. 7 shows an enlarged section of FIG. 6 in region A4.

FIGS. 6 and 7 schematically illustrate a part of a gear cutting machine 26 with several adjusting devices, all adjusting devices shown being equipped with auxiliary bodies and vibration dampers.

The first of the shown adjusting devices corresponds in its construction to the adjusting device of FIGS. 3 to 5. The base body 1' of this adjusting device is formed by the machine bed, while the movable body of this adjusting device is formed by a slide 2' on which a column 1" of a tool carrier is mounted. This adjusting device is used to move the column 1" with the aid of the slide 2' along the X axis (radial infeed axis) relative to the base body (here the machine bed) 1'. FIG. 6 shows in particular the guide carriages 8b, which are not visible in FIGS. 3 to 5, and the arrangement of the respective clamping device 9' below the auxiliary body 10' connected to it.

A second adjusting device is used to move a Z slide 2" along a vertical infeed axis Z relative to the column 1", a swivel device for a tool head being mounted on the Z slide 2". This adjusting device is also designed according to the principles of the design of FIGS. 3 to 5. The base body here is therefore the column 1", while the Z-slide 2" serves as the movable body. Auxiliary bodies 10" with clamping devices 9" are assigned to the Z-slide 2". The corresponding vibration dampers 11" are not visible in FIG. 6, but are indicated by an arrow.

A third adjusting device is used to swivel a swivel body 14 about a swivel axis 14a along a swivel direction A relative to the Z slide 2". The base body 1''' here is the Z-slide 2", while the swivel body 14 serves as the movable body 2'''. The swivel body 14 is supported rotatably on the Z-slide 2" (in its function as base body 1'''). The swivel drive for generating swivel movements of swivel body 14 (movable body 2') relative to Z slide 2" (base body 1''') is not visible in FIG. 6. The swivel body 14 (movable body 2') is assigned an auxiliary body 10''', which can be fixed to the Z-slide 2" (base body 1''') by clamping, and is connected to the swivel body 14 (movable body 2''') via two symmetrically arranged vibration dampers 11'''. For this purpose, the pistons of the vibration dampers 11' are connected to the auxiliary body 10''' via swivel joints. Thus, an effective vibration damping can also be achieved along the swivel direction A with respect to the swivel angle δ.

In practice, the swivel body 14 will in most cases carry a further adjusting device with a Y-slide, not shown here, to realize the so-called shift axis Y. The tool head with the tool spindle is then located on the Y slide. This adjusting device can also be constructed analogously to the adjusting devices along the X and Z axis.

Figure 8:
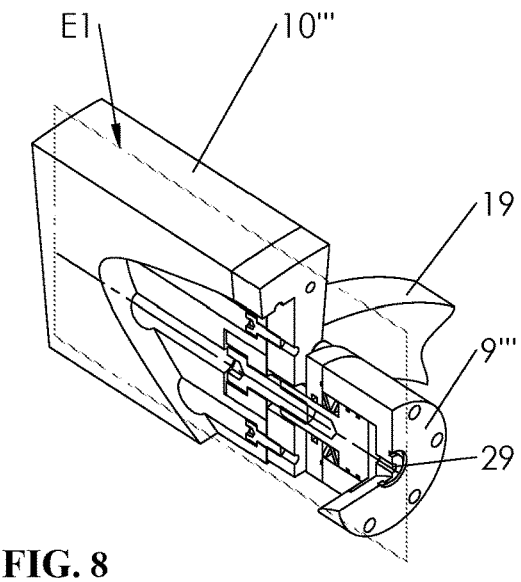
FIG. 8 shows a schematic representation of the guide of the auxiliary body of FIG. 7 with a ring-shaped guide element and the associated device for clamping, shown partially as a cutaway view.
Figure 9:
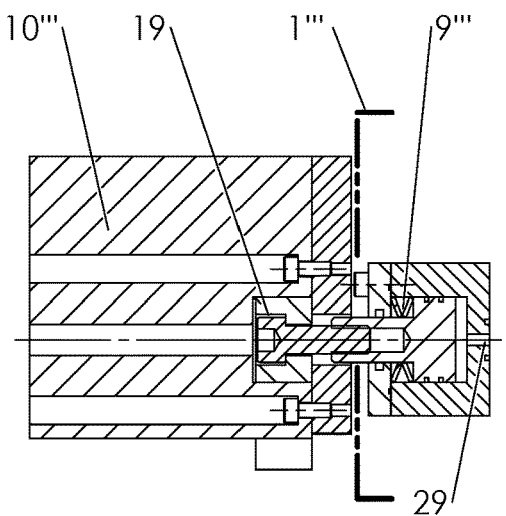
FIG. 9 shows a sectional view of the arrangement according to FIG. 8 in plane E1.

FIGS. 8 and 9 illustrate a possible embodiment for guiding and clamping the auxiliary body 10''', which is assigned to the swivel body 14 (movable body 2'''), on the Z slide 2" (base body 1'''). The base body 1' houses several hydraulically operated clamping devices 9"'. A ring-shaped guide rail 19 is rigidly connected to the axially movable pistons of these clamping devices 9"'. In this manner the guide rail 19 is rotationally fixed in relation to the base body 1' about the swivel axis 14a, but can be moved axially towards and away from the base body 1''' by a small distance by means of the clamping devices 9"'. The auxiliary body 10' runs as a carriage on this guide rail 19. When the guide rail 19 is moved axially towards the base body 1', it clamps the auxiliary body 10''' axially between the guide rail 19 and the surface of the base body 1' (shown only schematically in FIG. 9). Conversely, if the guide rail 19 is moved away from the base body 1''' again, this clamping is released again.

The axial movement of the guide rail 19 is performed hydraulically by the clamping devices 9'. The clamping devices are designed as hydraulically operated actuators. If a high hydraulic pressure is applied to a fluid connector 29 of the clamping device 9', the clamping device 9''' releases the clamping of the auxiliary body 10''' between the ring-shaped guide rail 19 and the base body 1', and the auxiliary body 10''' can now move unhindered on a circular path along the guide rail 19. Thus, the swivel body 14 (movable body 2') can be swivelled to the desired swivel angle, while the auxiliary body 10' can move unhindered. When the hydraulic pressure is deactivated, the clamping devices 9' use spring force to move the guide rail 19 back in the direction of the base body 1''' and thus clamp the auxiliary slide 10' to the base body 1''' again. This creates a rigid connection between the auxiliary body 10''' and the base body 1' at any angle.

Instead of the arrangement sketched in FIGS. 8 and 9, other arrangements for guiding an auxiliary body 10''' on a base body 1''' along a circular path and for fixing it to the base body 1' are also conceivable. For example, the auxiliary body 10''' can also be guided on the outer perimeter of the movable body 2' (swivel body 14). The auxiliary body 10''' can be guided on a guide rail which is rigidly connected to the base body 1'''. The clamping devices can then be arranged on the auxiliary body 10' itself so that they move with the auxiliary body when released. In particular, commercially available rotary clamping systems can be used for this purpose.

Figure 10:
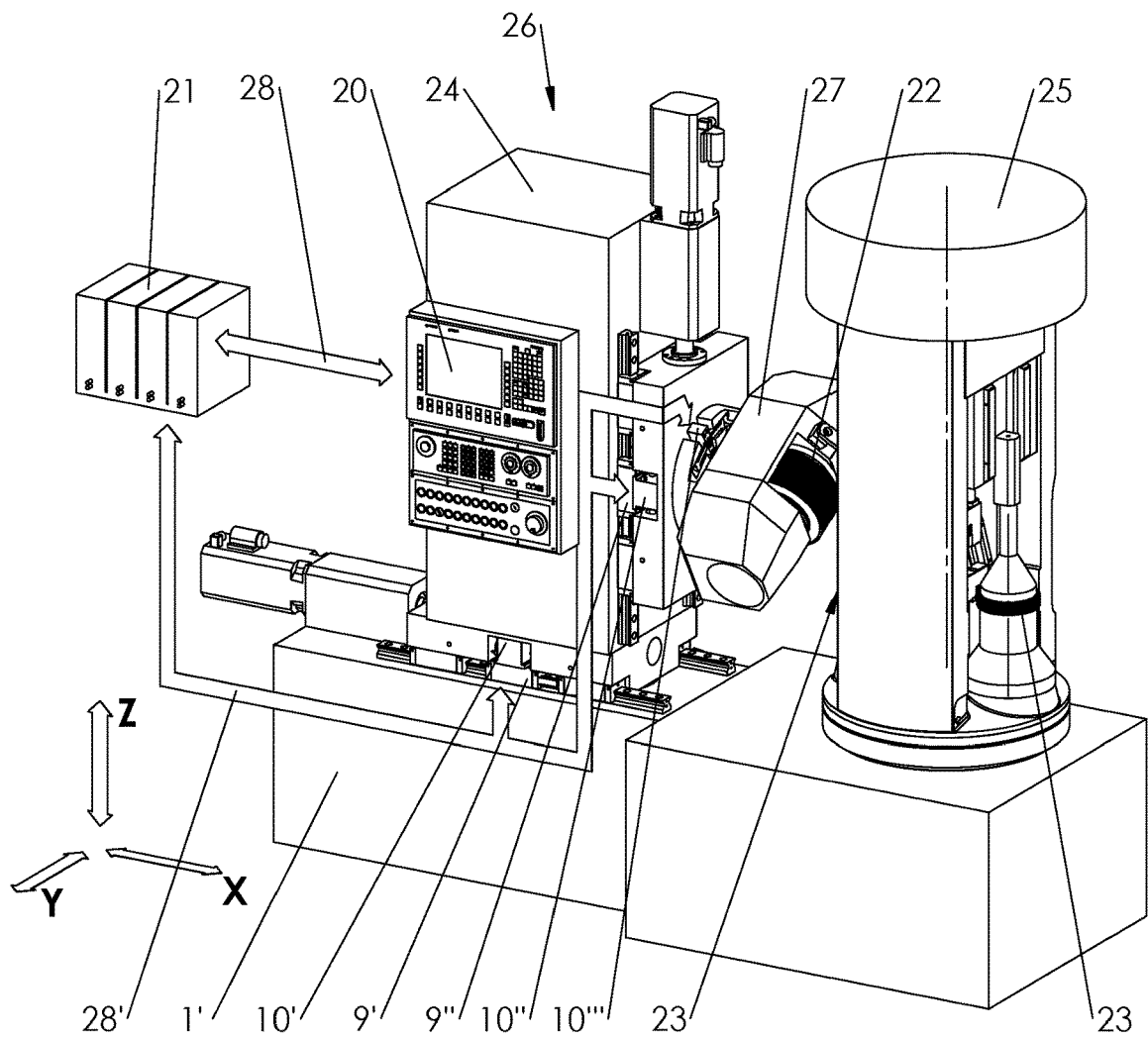
FIG. 10 shows a schematic diagram of a machine tool.

FIG. 10 schematically shows a complete gear cutting machine 26 for the fine machining of pre-toothed workpieces by means of generating gear grinding. A tool head (grinding head) 27 with generating grinding tool 22 is arranged on a tool carrier 24. Two workpiece spindles with pre-toothed workpieces 23 are arranged on a workpiece carrier 25, which is designed as a turret. By means of the turret, the workpiece spindles can be swiveled between a machining position and a workpiece change position. The actuators and sensors in the described linear and swiveling adjusting devices are connected to NC modules 21 of an NC control system via pressure lines, signal and power lines. By means of a control panel 20 of the NC control the NC modules 21 can be operated. The data flow for this is shown schematically by arrows 28 and 28'. Some of the NC modules may be designed in particular to control the clamping devices (examples are clamping devices 9', 9") for the various auxiliary bodies 10', 10", 10'". Another part of the NC modules 21 can also be designed to control one or more active vibration dampers and/or to change the damping properties of the active or passive vibration dampers.

In all designs shown, the vibration dampers preferably generate damping forces in the frequency range from 20 Hz to approx. 5 kHz, so that disturbing vibrations are suppressed or reduced in the entire relevant frequency range.

The following considerations can be made when dimensioning the range of travel (stroke length) of the vibration dampers used. In practice, only a very small range of travel of e.g. 10 to 20 mm is required for the radial infeed axis X, since during the machining of a workpiece with a clamped auxiliary body 10', only very small movements along this axis are usually made, e.g. to produce crowned or tapered shapes on the gear wheel. For the vertical infeed axis Z, on the other hand, the range of travel of the vibration dampers should be selected sufficiently large that a complete gear-wheel width can be machined without releasing the clamping of the auxiliary body 10". In practice, this means that a range of travel of up to 100 mm or even more may be required. A similarly large range of travel may also be required for the shift axis Y.

The clamping devices 9" of the vertical axis Z can also perform the additional function of securing the Z slide 2" against falling in the event of a fault. For this purpose, the clamping devices can be designed in such a way that they produce a clamping effect when they are currentless (in the case of an electrically controlled clamping device) or pressureless (in the case of a hydraulically controlled clamping device).

The adjusting devices described above can be installed in new machine, but can also be retrofitted in existing machines. By installing them in all geometry-determining linear axes X, Y and Z, a global damping structure can be realized in the machine tool. This is very well suited to effectively damp stray vibration energies where they occur. This prevents or minimizes their disturbing influence on the geometry of the gearwheel, and the occurrence of "ghost frequencies" can be largely avoided.

The adjusting devices according to the invention can be used in all types of gear cutting machines that perform a finishing operation on the tooth flanks of a gear, in particular gear cutting machines for generating grinding, partial generating grinding, profile grinding, hard hobbing, hard skiving, honing, etc.

The invention claimed is:

1. An adjusting device for a gear cutting machine, comprising:
    a base body;
    a movable body which is movable along a direction of movement relative to the base body;
    a drive for moving the movable body relative to the base body;
    an auxiliary body, which is releasably fixable to the base body and movable together with the movable body relative to the base body in a released state;
    a clamping device for releasably fixing the auxiliary body to the base body such that the auxiliary body and the base body form a rigid unit when the auxiliary body is fixed to the base body; and
    at least one vibration damper which is arranged between the auxiliary body and the movable body in such a manner that vibrations between the movable body and the rigid unit formed by the auxiliary body and the base body are damped by the at least one vibration damper when the auxiliary body is fixed to the base body,
    wherein the at least one vibration damper is further configured to follow a movement of the movable body in relation to the base body without a damping force of the at least one vibration damper counteracting said movement when the auxiliary body is in the released state,
    wherein the at least one vibration damper has damping characteristics that are modifiable, and
    wherein the adjusting device further comprises a device for performing a frequency response analysis, which is operatively connected to the at least one vibration damper in order to automatically modify the damping characteristics of the at least one vibration damper on the basis of a result of the frequency response analysis.

2. The adjusting device according to claim 1, comprising two vibration dampers which are arranged between the auxiliary body and the movable body, the two vibration dampers being arranged symmetrically on the movable body with respect to a normal plane extending perpendicularly to the direction of movement.

3. The adjusting device according to claim 1, wherein the at least one vibration damper is a passive vibration damper or an active vibration damper.

4. The adjusting device according to claim 1, comprising at least one NC-controlled actuator on the clamping device in order to fix the auxiliary body to the base body and/or to release the auxiliary body from the base body.

5. The adjusting device according to claim 1, comprising at least one sensor to determine one or more of the following quantities: a displacement between the auxiliary body and the movable body; a force between the auxiliary body and the movable body; and an acceleration of the movable body relative to the auxiliary body.

6. The adjusting device according to claim 1,
    wherein the movable body is configured as a carriage,
    wherein the adjusting device comprises a linear guide, and
    wherein the movable body is guided on the base body by the linear guide.

7. The adjusting device according to claim 6, wherein the linear guide is configured as a rolling guide.

8. The adjusting device according to claim 6,
    wherein the linear guide comprises a linear guide element,
    wherein the linear guide element is axially immovably connected to the base body,
    wherein the movable body is guided on the linear guide element of the linear guide, and
    wherein the auxiliary body is also guided on the linear guide element of the linear guide.

9. The adjusting device according to claim 8, wherein the clamping device is configured for releasably fixing the auxiliary body to the linear guide element of the linear guide.

10. The adjusting device according to claim 6,
    wherein the adjusting device comprises an auxiliary guide, which is formed separately from the linear guide,
    wherein the auxiliary body is guided on the base body by the auxiliary guide.

11. The adjusting device according to claim 10,
    wherein the auxiliary guide comprises a linear guide element,
    wherein the linear guide element of the auxiliary guide is axially immovably connected to the base body,
    wherein the auxiliary body is guided on the linear guide element of the auxiliary guide, and wherein the clamping device is configured for releasably fixing the auxiliary body to the linear guide element of the auxiliary guide.

12. The adjusting device according to claim 1, wherein the movable body is configured as a swivel body which is mounted on the base body so as to swivel about a swivel axis.

13. The adjusting device according to claim 12, comprising a guide element which extends along at least a partial ring and is connected to the base body in a rotationally fixed manner with respect to the swivel axis, the auxiliary body being guided on the guide element.

14. The adjusting device according to claim 13, wherein the clamping device is configured for releasably fixing the auxiliary body to the guide element extending along at least the partial ring.

15. A gear cutting machine comprising:
a machine bed;
a column movably arranged on the machine bed;
a feed slide movable arranged on the column;
a tool head arranged on the feed slide to swivel; and
at least one adjusting device according to claim 1 for moving the column relative to the machine bed, for moving the feed slide relative to the column, or for swiveling the tool head relative to the feed slide.

16. A method of machining a pre-toothed workpiece with a gear cutting machine comprising the adjusting device of claim 1, the method comprising the following steps:
releasing the auxiliary body from the base body;
moving the movable body relative to the base body with the drive, while the auxiliary body is released from the base body;
fixing the auxiliary body to the base body; and
machining the workpiece while the auxiliary body is fixed to the base body,
wherein the method further comprises:
performing the frequency response analysis; and
automatically modifying the damping characteristics of the at least one vibration damper on the basis of the result of the frequency response analysis.

17. The method according to claim 16, wherein the movable body is moved relative to the base body during machining of the workpiece with the drive, while the auxiliary body remains fixed to the base body.

18. An adjusting device for a gear cutting machine, comprising:
a base body;
a movable body which is movable along a direction of movement relative to the base body;
a drive for moving the movable body relative to the base body;
an auxiliary body, which is releasably fixable to the base body and movable together with the movable body relative to the base body in a released state;
a clamping device for releasably fixing the auxiliary body to the base body such that the auxiliary body and the base body form a rigid unit when the auxiliary body is fixed to the base body; and
at least one vibration damper which is arranged between the auxiliary body and the movable body in such a manner that vibrations between the movable body and the rigid unit formed by the auxiliary body and the base body are damped by the at least one vibration damper when the auxiliary body is fixed to the base body,
wherein the at least one vibration damper is further configured to follow a movement of the movable body in relation to the base body without a damping force of the at least one vibration damper counteracting said movement when the auxiliary body is in the released state, and
wherein the adjusting device further comprises at least one sensor to determine one or more of the following quantities: a displacement between the auxiliary body and the movable body; a force between the auxiliary body and the movable body; and an acceleration of the movable body relative to the auxiliary body.

19. The adjusting device according to claim 18, comprising two vibration dampers which are arranged between the auxiliary body and the movable body, the two vibration dampers being arranged symmetrically on the movable body with respect to a normal plane extending perpendicularly to the direction of movement.

20. The adjusting device according to claim 18, comprising at least one NC-controlled actuator on the clamping device in order to fix the auxiliary body to the base body and/or to release the auxiliary body from the base body.

21. The adjusting device according to claim 18,
wherein the movable body is configured as a carriage,
wherein the adjusting device comprises a linear guide, and
wherein the movable body is guided on the base body by the linear guide.

22. The adjusting device according to claim 18, wherein the movable body is configured as a swivel body which is mounted on the base body so as to swivel about a swivel axis.

* * * * *